United States Patent [19]

Stein

[11] 3,787,672

[45] Jan. 22, 1974

[54] ELECTRONIC CALCULATING DEVICE HAVING ARITHMETIC AND ERROR-CHECKING OPERATIONAL MODES

[76] Inventor: John W. Stein, 17129 Chiswell Rd., Poolesville, Md. 20837

[22] Filed: May 30, 1972

[21] Appl. No.: 257,544

[52] U.S. Cl. .......... 235/153 BD

[51] Int. Cl. .......... G06f 11/10

[58] Field of Search. 235/153 BD, 169, 176, 92 CP, 235/92 EC

[56] References Cited

UNITED STATES PATENTS

| | | | |
|---|---|---|---|
| 2,837,278 | 6/1958 | Schreiner et al. | 235/153 BD |
| 3,260,840 | 7/1966 | King | 235/169 |
| 3,098,994 | 7/1963 | Brown, Jr. | 235/153 BD |
| 3,222,506 | 12/1965 | Meade | 235/169 |
| 3,602,704 | 8/1971 | Akushsky et al. | 235/153 BD |

*Primary Examiner*—Charles E. Atkinson
*Attorney, Agent, or Firm*—Cantor & Kraft

[57] ABSTRACT

A novel portable hand-held electronic calculating device is disclosed, the calculating device having arithmetic and error-checking operational modes. The device incorporates a keyboard having a plurality of keys thereon representative of different integers such as in the usual base 10 numeral system. Actuation of a key effects generation of an electrical pulse output. A controllable electronic counter means is coupled to the keyboard for arithmetically counting the pulse output to thereby define the arithmetic mode of the device. The counter means can be controlled so as to selectively effect counting of the electrical pulse output of the keyboard in a different integer base, such as in a base 9 numerical mode. Answers obtained from arithmetic operations in a base 10 system can thereby be checked by the novel calculating device utilizing the so-called "casting of 9's" principle.

5 Claims, 1 Drawing Figure

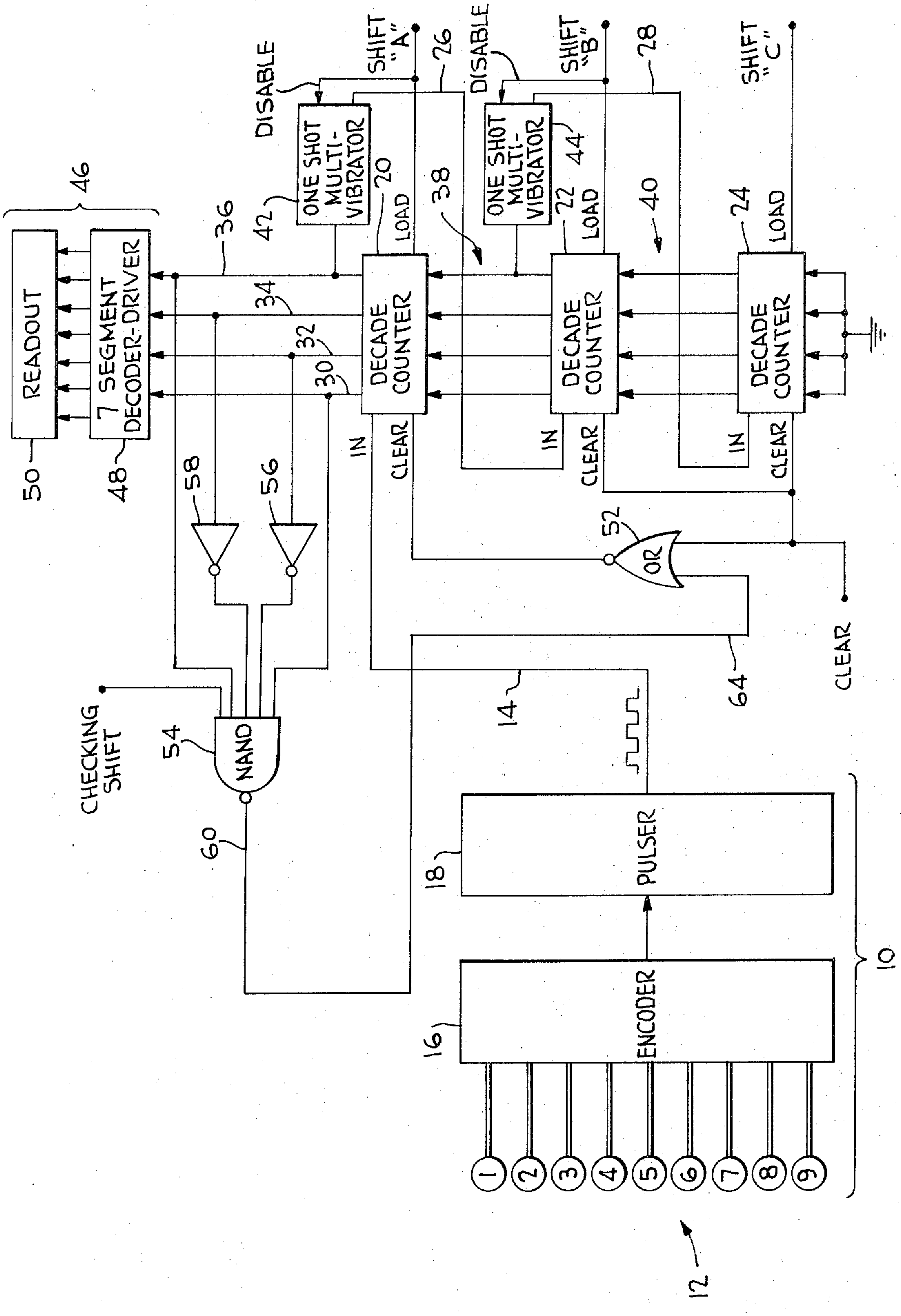
READOUT
7 SEGMENT DECODER-DRIVER
46
50
48
36
34
32
30
ONE SHOT MULTI-VIBRATOR
ONE SHOT MULTI-VIBRATOR
DISABLE
DISABLE
SHIFT "A"
SHIFT "B"
SHIFT "C"
26
28
42
44
20
22
24
38
40
LOAD
LOAD
LOAD
DECADE COUNTER
DECADE COUNTER
DECADE COUNTER
IN
IN
IN
CLEAR
CLEAR
CLEAR
58
56
52
OR
CLEAR
64
14
CHECKING SHIFT
54
NAND
60
PULSER
18
ENCODER
16
10
1
2
3
4
5
6
7
8
9
12

ELECTRONIC CALCULATING DEVICE HAVING ARITHMETIC AND ERROR-CHECKING OPERATIONAL MODES

BACKGROUND OF THE INVENTION

This invention generally relates to electronic calculating devices and particularly concerns a portable, hand-held electronic calculating device which has both arithmetic and error-checking operational modes.

In recent years, small, portable, and hand-held electronic calculators have become increasingly popular, such portable calculators operating either as a substitute or supplement to the larger desk-top models, and usually without a loss in full arithmetic function capabilities. Advances in electronic circuit technology, particularly in miniaturization of components, have made the provision of such complex hand-held electronic calculator units possible, albeit at what may well be a prohibitively expensive price for an average consumer. Further, the average consumer does not require such complex electronic calculators which are capable of performing complex multiplication and division, mixed calculations, algebraic and trigonometric functions, and which have storage capacities of 8 and 12 digits with answers read out to the nearest thousandth or millionth. The complexity as well as high cost of these typical units which provide capabilities that are little used and quite often superfluous has restricted the utilization of the typical portable electronic calculator by the great mass of consumers.

BRIEF SUMMARY OF THE INVENTION

It is thus apparent that a need exists in the art for a portable, hand-held electronic calculating device which departs from traditional design approaches and offers the average consumer a functionally realistic product of simple design which can be utilized for day-to-day mathematical activities. It is the primary objective of the instant invention to provide such a calculating device.

A further objective of the instant invention concerns the provision of a portable, hand-held electronic calculating device which can itself perform a basic and useful mathematical function, such as addition, and further which provides the user with an electronic means to check the accuracy of other basic mathematical operations previously performed.

Still another objective of the instant invention concerns the provision of a small hand-held electronic calculator which automatically and electronically eliminates the drudgery of performing addition, the most common mathematical calculation performed by the consumer.

A more specific objective of the instant invention, though equally important, is to provide an electronic calculating device which, through utilization of the well-known "casting of 9's" mathematical principle, can check previously performed addition, subtraction, multiplication and division and provide an indication as to whether the previous result obtained is correct.

Yet another objective of the instant invention concerns the provision of a portable electronic calculating unit as above-described which can be manufactured at an extremely low cost, thus increasing its potential availability to the great bulk of potential consumers.

These objectives, as well as others which will become apparent as the description proceeds, are implemented by the instant inventive electronic calculating device which, as aforestated, is contemplated to be small, portable, and hand-held, the calculating device providing both arithmetic and error-checking operational modes. In the preferred inventive embodiment, a keyboard means is provided having a plurality of keys thereon representative of selected numbers in a given numerical base, such as the customary base 10. Actuation of a key serves to generate an electrical pulse output representative of the selected number.

The novel calculating device incorporates electronic counter means which arithmetically counts the electrical output from the keyboard, also in a numerical base 10 system, to provide a standard arithmetic addition function. Read-out means are coupled to the counter for displaying the count stored therein and the utilisor of the device, simply through actuation of various keys on the keyboard means, can input into the counter different numbers, have the counter add such numbers, and have the result read-out or otherwise visually displayed.

The basic arithmetic addition operation is perhaps the most common undertaken by an average consumer, yet, this operation is also the most susceptible to error. The instant inventive unit therefore, serves to electronically perform this addition, and thus eliminates the necessity of hand calculations of a column of numbers.

In the preferred inventive embodiment, this mathematical addition function is carried out by the counter means in a somewhat novel and unusual manner. For example, the preferred inventive embodiment uses a plurality of decade counters connected in a staged or series relationship to one another such as in a chain, the overflow or carry from one counter providing an input to the next counter in the chain. The preferred inventive embodiment contemplates the provision of a single read-out means which is coupled to the first counter of the chain, and a novel switching or transfer circuit by which counts stored in other counters of the chain can be automatically transferred into the first counter of the chain to be thereby visually displayed by the read-out device. Accordingly, since only a single read-out device is required, the cost of manufacture and the ultimate retail cost of the device is markedly reduced, without deleteriously affecting the device capabilities at all.

The novel apparatus further incorporates, as aforementioned, an error-checking operational mode, in which mode the inventive device serves to check answers previously obtained to virtually any basic mathematical operation, which answers could have been obtained through ordinary hand calculation. Thus, rather than stripping an individual of his own skill to perform basic mathematical operations, the inventive device offers the user an apparatus which supplements his everyday mathematical hand calculations. Specifically, once the answer to a mathematical operation has been obtained, the novel device, when properly operated, will tell the user whether the answer obtained was correct or incorrect. This error-checking operational mode has utility for all four basic mathematical operations, including addition, subtraction, multiplication, and division, wherein the user performs his own calculations, by hand for example, and the device of the instant invention indicates whether the answer obtained is correct.

To achieve this unique error-checking operational mode, the above-discussed electronic counter means has coupled thereto a control means therefor such that the counter means can selectively effect counting of the electrical pulse output of the keyboard in a different integer base than the ordinary base 10, such as in a numerical base 9, for example. By this simple electronic provision, the device of the instant invention can be utilized to perform a so-called "casting of 9's" mathematical error-checking operation in the preferred inventive embodiment thereof.

In this respect, it should be appreciated by those skilled in the mathematical arts that the "casting of 9's" error-checking technique is a well-known technique wherein the 9's are "cast-out" of a number when the number is divided by 9, leaving a remainder, which remainder also includes the digit zero. The remainder, being obtained by the division by 9, may be termed the "excess" of 9's. In a decimal or base 10 system, it will be appreciated that the excess of 9's in any given number equals the excess of 9's in the sum of its digits. For example, and considering the number 825, the sum of its digits is 15. According to the above-stated rule, the excess of 9's in 825 equals the excess of 9's in 15, which excess of 9's is 6. Likewise, the excess of 9's in the number of 825 is also 6, which can be verified by dividing 825 by 9, and noting that the remainder is 6.

This technique, when utilized to check simple addition, operates as follows. For example, assume that it is desired to add together the following numbers: $321 + 46 + 98 = 465$. The "excess" of 9's in the number 321 is obtained by adding together its digits $3 + 2 + 1$ which equals 6. The number 6 divided by 9 leaves a remaider of 6, 6 therefore being the "excess of 9's." The digits of the number 46 added together is $4 + 6 = 10$ which, when divided by 9, leaves an excess or remainder of 1. The digits of the number 98 when added together, is $9 + 8 = 17$ which, when divided by 9, leaves a remainder or excess of 8. Adding together each of the above-determined "excess of 9's" or remainders, we have $6 + 1 + 8 = 15$ which, when divided by 9, leaves a final excess of 6.

Next, adding the digits of the obtained answer of 465, we have $4 + 6 + 5$ which equals 15. Dividing 15 by 9, leaves a remainder of 6, which, it will be noted, is the same as the previously calculated remainder or "excess of 9's" above-determined. Since this remainder is the same, a very high degree of probability exists that the answer obtained to the addition is correct.

It should further be noted that this "casting or 9's" principle, as applied to addition, has the peculiar advantage that the digits of the numbers added together to obtain the answer can be added in virtually any order. For example, consider again the numbers 321, 46 and 98. When "casting 9's" out of these numbers, the digits can be added in any random fashion, such as $8 + 9 + 4 + 6 + 2 + 3 + 1 = 33$ which, when divided by 9, leaves a remainder or "excess" of 6, the same result previously obtained. This excess or remainder, of course, is the same as the excess or remainder in the answer 465 which, as afore-stated, serves to verify the answer.

The subtraction operation can be checked with a "casting of 9's" technique in a very similar fashion. For example, assume that it is desired to subtract the number 15 from the number 42, resulting in an answer of 27. To check this answer, one first would "cast 9's" from the number 27 by dividing 27 by 9, leaving a remainder of 0. Dividing the number 15 by 9 leaves a remainder of 6. Of course, one could have added the digits of each of these numbers and then divided by 9 to obtain the same result. For example, $2 + 7 = 9$, which has a zero remainder. $1 + 5 = 6$, which, when divided by 9, leaves a remainder of 6. The number 42, when divided by 9, or when its digits $4 + 2$ are added and the result divided by 9, leaves an excess or remainder of 6. Now, adding together the previously obtained remainders from the answer 27 and the subtrahend 15, gives us the number 6, which is the same as the excess of obtained in the minuend 42.

The "casting out of 9's" principle also functions as an excellent check for previously performed multiplication. Consider, for example, the multiplication of the number $21 \times 35$, resulting in a product of 735. In the multiplicand, the sum of the digits $2 + 1 = 3$, which, when divided by 9, leaves an excess of 3. In other words, 21 divided by 9 leaves a remainder of 3. The sum of the digits of 35 is $3 + 5$ which, when divided by 9, leaves an excess or remainder of 8. Similarly, 35 divided by 9 leaves a remainder of 8. Multiplying together the excesses or remainders so obtained, $8 \times 3 = 24$. The sum of the digits $2 + 4 = 6$, which when divided by 9, leaves an excess of 6. The sum of the digits of the product is $1 + 0 + 5$ which, when divided by 9, leaves an excess or remainder of 6. Thus, one can be reasonably certain that the product is correct. Stated in a general fashion, the product of the remainders obtained by casting 9's from each multiplicand should be equal to the remainder or excess obtained by casting 9's from the product, if the product has been correctly calculated.

A similar technique can be applied to check division utilizing the "casting of 9's" principle. For example, let it be assumed that it is desired to divide the dividend 3158 by a divisor 75, resulting in a quotient of 42 and 8/75ths. Checking this answer through the "casting of 9's" principle, one would first find the excess of 9's in the divisor 75, which can simply be obtained by adding the digits $7 + 5 = 12$ which, when divided by 9, leaves an excess of 3. The excess of 9's in the integer portion of the quotient 42 is obtained by adding the digits $4 + 2 = 6$ which, when divided by 9, leaves a remainder of 6. Now, $3 \times 6 + 8$ (8 being the number obtained from the normal remainder 8/75) $= 26$ which, when divided by 9, leaves a remainder of 8. Similarly, the digits $2 + 6$ could have been added to obtain 8, which, when divided by 9, provides a remainder or excess of 8.

Adding the digits of the dividend $3 + 1 + 5 + 8 = 17$ which, when divided by 9, leaves a remainder of 8. Since this remainder or excess is the same as that obtained above, one can be reasonably assured that the quotient is correct.

Those of ordinary skill in the art are referred to standard elementary arithmetic texts for a discussion in greater depth of the "casting of 9's" principle. Further, it should be appreciated that a similar error-checking technique such as "casting of 11's" could be utilized and, in fact, it appears that arithmetic performed in any system of a given number base $n$ can be checked by a "casting" technique in a numerical base $n - 1$, or $n + 1$, thus corresponding to the "casting of 9's" and the "casting of 11's." The error-checking operational mode of the instant invention is thus broadly contemplated to encompass such "casting" techniques as will be seen hereinbelow.

With this background of error-checking techniques, the utility of the instant inventive electronic calculating device operating in its above-defined error-checking operational mode can be appreciated since numbers inputted into the electronic counter means during such error-checking mode would, in fact, be counted in a base 9 rather than a base 10 system in the preferred embodiment, thus effecting an automatic "casting of 9's" and leading to a highly reliable check of the accuracy of previously performed mathematic operations. Thus, while the contemplated preferred embodiment of the electronic calculating device itself has capabilities of automatically and electronically performing a mathematic addition function, teh versatility of the device, when considering its error-checking capabilities, is considerably more far reaching.

BRIEF DESCRIPTION OF THE DRAWINGS

The invention will be better understood and further advantages and features thereof will become apparent from the following detailed description of the preferred inventive embodiment, such description making reference to the appended sheet of drawings wherein the single FIGURE thereon depicts a preferred electrical schematic diagram of the electronic calculating device of the instant invention.

DETAILED DESCRIPTION OF A PREFERRED INVENTIVE EMBODIMENT

Referring now to the drawings, the electrical schematic diagram of the novel electronic calculating device of the instant invention is depicted. The calculating device incorporates a keyboard means 10 which has a plurality of keys generally designated by reference numeral 12 associated therewith, actuation or depression of various ones of said keys 12 effecting an electrical output from the keyboard means 10 on output line 14. Specifically, and in the preferred inventive embodiment, actuation or depression of any one of keys 12 which represent selected numbers of a given integer base, such as the typical base 10, is encoded via an encoder means 16 which is coupled to and serves to actuate an electrical pulser 18 such that depression of the second key is interpreted by encoder means 16 and serves to cause pulser 18 to generate a series of pulses on the output 14 thereof, the number of pulses in said series being two. Similarly, actuation or depression of the sixth key of the keyboard means 10 would effect a series of six pulses from the pulser means 18 upon output line 14. Accordingly, the electrical output from the keyboard means 10 is representative of and reflects a selected number of a given integer base, such as base 10. The detailed construction of the keyboard means 10 of the instant invention forms no part of the instant invention and virtually any prior art keyboard device effecting this typical function can be utilized.

The keyboard means 10 is coupled to a controllable electronic counter means which, in the preferred inventive embodiment, constitutes a plurality of decade counters 20, 22 and 24 connected in a series or chain relationship with one another such that an overflow or carry output from one counter constitutes the input to the next counter in the chain. The specific manner in which these overflow or carry outputs are coupled into the next counter of the chain will be discussed hereinbelow, though it should be noted that the "overflow" or carry line 26 from decade counter 20 comprises the input to decade counter 22, whereas the overflow or carry output 28 from decade counter 22 consitutes the input to decade counter 24.

Each of the decade counters 20, 22 and 24 are constructed in accordance with the prior art and each could comprise a decade counter manufactured by Texas Instruments, under Model No. SN74196, for example. Each decade counter 20, 22 and 24, upon receipt of 10 input pulses, automatically effects an internal "clear" operation and the generation of an overflow pulse on a non-illustrated counter output in conventional fashion. Each of the decade counters 20, 22 and 24 are constructed in so-called binary "staged" fashion, providing a plurality of intermediate outputs representative of the binary states of various flip flops therein. For example, and referring specifically to decade counter 20, intermediate outputs 30, 32, 34 and 36 are provided, these intermediate outputs representing the internal states of decade counter 20, respectively defined by $2^0$, $2^1$, $2^2$, $2^3$, or, in decimal numbers, these intermediate outputs respectively represent an internal state of 1, 2, 4, and 8 of the individual decade counter 20. Similarly, each of the other decade counters 22 and 24 are provided with intermediate outputs respectively designated by reference numerals 38 and 40, which represent the internal count of the individual decade counter in the typical binary fashion of 1, 2, 4 and 8. Again, this designation of intermediate outputs is conventional in the art and further discussion thereof is not necessary for an understanding of the instant Each of the decade counters 20, 22 and 24 have further associated therewith a "load" input which are respectively coupled to manually actuatable keys designated by SHIFT "A", SHIFT "B", and SHIFT "C." Actuation of a SHIFT key effects a grounding of its associated LOAD line which, due to the conventional construction of the decade counters, effects a shifting of the contents from one counter to the next preceding counter in the chain. Specifically, actuation of the key SHIFT "A" serves to dump into decade counter 20 the internal count stored in decade counter 22 via intermediate output lines 38. Actuation of the key designated SHIFT "B" serves to dump or transfer into counter 22 the internal count of contents of decade counter 24 via intermediate outputs 40. Actuation of key SHIFT "C" serves to dump into decade counter 24 a "zero" or ground signal thus setting decade counter 24 to zero.

The provision of the plurality of counters 20, 22 and 24 in the above-described series chain effects a capability of the overall counter means to count, in a decimal or base 10 system, to the number 999, as should be apparent. In this respect, the carry or overflow from one counter to the next is derived in a somewhat unusual fashion. Specifically, it should be noted that a one-shot multivibrator means 42 is coupled in the overflow or carry line 26 of decade counter 20 between the intermediate output 36 thereof, and the input to the next counter of the chain, i.e. decade counter 22. One-shot multi-vibrator means 42 may comprise a conventional device such as Texas Instruments Model SN 74122, and functions to generate a pulse on the overflow or carry line 26 upon the trailing edge of a pulse sensed on intermediate line 36 of decade counter 20. As decade counter 20 receives input pulses from the keyboard means 10 on line 14, the state of the intermediate outputs 30 – 36 thereof will change. On the first pulse, only intermediate output 30 will be energized. On the second input pulse to the decade counter 20, only intermediate output 32 will be energized. On the third input pulse, both intermediate outputs 30 and 32 of counter 20 will be energized. On the fourth input pulse, only intermediate output 34 will be energized. On the fifth input pulse, outputs 30 and 34 will be energized. On the sixth input pulse, outputs 32 and 34 will be energized. On the Seventh input pulse, output lines 30, 32, and 34 will be energized. On the eighth input pulse, only intermediate output 36 will be energized, thus placing one-shot multi-vibrator means 42 into a so-called "ready" state. On the ninth input pulse, the intermediate output 36 will remain in its energized state and, in addition, intermediate output 30 will be energized. Finally, on the tenth input pulse to decade counter 20, the decade counter 20 effects its own automatic re-set or "clear", thus de-energizing all of the intermediate output lines 30, 32, 34 and 36. When intermediate output 36 is de-energized, the trailing edge of the pulse or signal on the line 36 is sensed by the one-shot multi-vibrator 42 to effect a pulse on carry or overflow line 26 providing an input to decade counter 22. An additinal mutli-vibrator 44 is provided in the overflow or carry line 28 from decade counter 22 to the input of decade counter 24 and operates in similar fashion. In this manner, a normal decimal counting of the input pulses provided by the keyboard means 10 is effected up to the number 999, for example. Of course, additional capacity of the counter means could be provided if desired in well-known fashion.

A read-out means designated by reference numeral 46 is generally coupled to the counter means above-described so as to display the count stored therein. In the specific preferred inventive embodiment, a single read-out means is provided coupled only to the decade counter 20, which counter constitutes the first counter in the counter chain. Read-out means 46 incorporates a decoder 48 connected between the intermediate outputs 30 – 36 of counter 20, and a visual numerical display or read-out device 50. Such a read-out means 46 itself is of conventional construction and could, for example, comprise a decoder available through Texas Instruments, under Model No. SN7447N.

With the circuitry as above-described, addition in a numerical base 10 system can readily be achieved. Due to the simple and basic circuitry designated, addition of a plurality of numbers must be effected in a column by column fashion. For example, let it be assumed that the user of the electronic calculating device wishes to add together the numbers 34 + 68 + 72. To effect this addition, the user would first depress the key 4 of the keyboard means 10 resulting in the generation of four pulses on output line 14, thus providing decade counter 20 with an internal count of 4. The key representative of numeral 8 would then be actuated on keyboard means 10 resulting in the generation of 8 pulses on output line 14. Decade counter 20 would be filled to its capacity after the generation of the sixth pulse, and would thus effect a carry or overflow on line 26 inputting to decade counter 22 setting this counter with an internal state of 1. The remaining two pulses provided to decade counter 20 would serve to provide an internal state therein representative of the number 2. Thus, in decade counter 20, the number 2 would be stored and, in decade counter 22, the number 1 would be stored. The user of the device would then depress the key representative of number 2 providing two pulses on output 14 which would re-set the internal count of decade counter 20 to 4. At this point, stored in decade counter 20 would be the number 4, while decade counter 22 would have stored therein the number 1. Since there has been no overflow input to decade counter 24, counter 24 would have a zero count stored therein.

The read-out means 46 coupled to decade counter 20 would thus visually display the number 4. The user of the device would note this number on a sheet of paper, for example, and would then, in sequence, actuate shift keys SHIFT "A", SHIFT "B", and SHIFT "C", to respectively transfer the count in decade counter 22 into counter 20, to transfer the count in counter 24 to counter 22, and to place a zero into counter 24. As a result of this successive depression of SHIFT keys A, B, and C, decade counter 20 would have an internal count of 1 therein, whereas the remaining decade counters 22 and 24 now would have a zero count. To prevent any spurious actuation of multi-vibrators 42 and 44 and a resultant erroneous signal to the various counters 22 and 24 during the transfer operation, the multi-vibrators are disabled by actuation of the SHIFT "A" and "B" keys.

The user would then add the "tens" column of the previously designated numbers in like fashion by depressing, in sequence, the keys representative of the digits 3, 6 and 7 on the keyboard means 10. As a result, decade counter 30 would have stored therein the internal count 7, whereas decade counter 22 would have stored therein the internal count 1. No count would be stored in counter 24.

The read-out means 46 would thus display the number 7 and the user of the device would note this number as being the result of the addition and the digit to be placed in the "tens" column. The user would then depress, in sequence, SHIFT keys A, B, and C transferring a zero into decade counter 24, transferring a zero into decade counter 22, and transferring the 1 stored in decade counter 22 into decade counter 20. Read-out means 46 would now display the 1, which count would be noted by the user as the digit in the "hundreds" column of the answer. The user would now have written the number 174 as the result of the afore-mentioned addition. To make certain that there was not a carry-over into the "thousands" column, the user would once again depress SHIFT keys A, B, and C in sequence and would note that the display means 46 indicated the number zero.

After performing this addition, the counter means of the instant invention can be cleared and re-set to zero by actuation of the "clear" key which is directly coupled to decade counters 22 and 24, and is coupled, through an Or-gate 52, to counter 20. The function of Or-gate 52 will become clear from the discussion of the error-checking mode of the instant invention. At this point, the actual arithmetic operational mode of the invention should be understood by those skilled in the art.

Shifting of the electronic calculating device of the instant invention into an error-checking mode whereby the "casting of 9's" technique can be utilized to check previously performed mathematic operations is readily achieved through actuation of the checking shift key coupled to NAND gate 54. By so actuating the checking shift key, the zero input is placed onto the associated line to NAND gate 54 and the counter means of the instant invention is automatically constrained to effect counting of the electrical pulse output of the keyboard means 10 in a different integer base than the integer base previously utilized. Specifically, and in the preferred inventive embodiment, actuation of the checking shift key serves to effect counting by the counter means in a base 9, rather than in a base 10, numerical system.

In this respect, it should be appreciated that to effect counting in a base 9 system, the decade counters 20, 22 and 24 must serve to count up to the number 8 and, on the ninth input pulse thereto, effect an internal clearing, as well as a generation of a carry or overflow pulse on respective lines 26 and/or 28. A novel logic circuit means is coupled to the counter means so that this operation can readily be effected.

Specifically, it should be noted that the intermediate outputs 30, 32, 34 and 36 constitute inputs to the NAND gate 54, in addition to the input provided by the checking shift key. Coupled between the NAND gate inputs and the intermediate outputs 32 and 34 are inverter circuit means 56 and 58. With this arrangement, on the ninth pulse fed into decade counter means 20 from the keyboard means 10 and with the checking shift key actuated to provide an additional positive input, all inputs to the NAND gate 54 will be positive. The output 60 from NAND gate 54 will therefore go negative. If any input to the NAND gate 54 were negative, the output 60 from the gate would be positive. The output from NAND gate 54 provides an input to Or-gate 52. Thus, on the ninth pulse to decade counter 20, when the calculator device is in the error-checking operational mode by virtue of actuation of the checking shift key, a negative pulse will be applied from the output of NAND gate 54 along line 64 through the Or-gate 52 to effect a clearing and automatic resetting of decade counter 20. When decade counter 20 is thus cleared or re-set, the pulse or voltage signal that was previously present on intermediate output 36 thereof due to the internal count of 9's stored therein is removed, effecting a triggering of the one-shot multivibrator 42 and the generation of an overflow or carry pulse on line 26 providing an input to decade counter 22. In the above-described fashion, the counting means of the instant invention now effectively counts in a base 9 system, whereby the "casting of 9's" error-checking technique can be used.

For example, and referring once again to the initial mathematical addition of the number 34 + 68 + 72 described above, an error-checking of the sum obtained of 174 can be effected. The electronic calculating device of the instant invention would be shifted into its error-checking operational mode due to actuation of the checking shift key coupled to NAND gate 54. The user of the device would then input, from the keyboard means 10, and in any order, the digits 3, 4, 6, 8, 7 and 2, since the counter means of the instant invention is, at this time, counting in a base 9 system, the internal state of counter 20 after the above-described inputs, would have stored therein the number 3. The internal states of counters 22 and 24 are not utilized and, in fact, are irrelevant since, as should be appreciated, the number 3 is the "excess of 9's" obtained by adding the digits, in any order, 3, 4, 6, 8, 7 and 2. This number 3 would appear on the read-out means 46 and would be noted by the user. The user would then clear the counter means through actuation of the clear key and would input his obtained answer of 174 by actuating the associated keys 12 of the keyboard means 10 in any order. Since the counter means is still in the base 9 mode, the number stored in counter 20 after the aforementioned input would be 3, this number constituting the "excess of 9's" obtained from the addition of the digits 1 + 7 + 4 divided by 9, the remainder being 3. Since the "excess" obtained by adding the digits of the sum is the same as the "excess" obtained by adding the digits, in any order, of the numbers added together to form the sum, the user of the device can be reasonably certain that his addition was correct.

As mentioned at the outset, this error-checking operational mode can be utilized to check previously performed addition, subtraction, multiplication, and/or division simply by actuating the representative keys of the keyboard means 10 while the calculating device is in its error-checking or base 9 mode. In this respect, and from a general point of view, the device of the instant invention serves to automatically "cast 9's" from any number or series of numbers inputted therein while in the error-checking mode thereof. The instant inventive device, therefore, operates as a supplement to the user's own mathematical abilities.

It should further be appreciated by those skilled in the art that the circuitry above-discussed can, of course, be miniaturized using conventional techniques so as to provide an overall device of minimal physical size. For example, integrated circuits can be utilized for the majority of the functional components above-discussed. In addition, it should be appreciated by those skilled in the art that while there has been shown and described a present preferred embodiment of the invention, the invention is not limited thereto, but may otherwise be variously embodied and practiced within the scope of the following claims. It should now be apparent from the foregoing detailed description that the objects set forth at the outset of this Specification have been successfully achieved. Accordingly,

What is claimed is:

1. An electronic calculating device having arithmetic and error-checking operational modes, said device comprising:

keyboard means for generating a digital pulse electrical output, the number of such pulses being representative of selected numbers in base 10;

controllable electronic counter means for arithmetically counting the electrical output of said keyboard means, said counter means including at least one digital decade counter normally effecting counting of said digital pulses in base 10 to thereby define the arithmetic mode of the device;

selective logic circuit means coupled to said decade counter for automatically re-setting same upon receipt of every ninth digital pulse from said keyboard means so as to effectively count the electrical output of said keyboard means in base 9 to thereby define the error-checking mode of the device; and read-out means coupled to said counter means for displaying the count stored therein.

2. A device as defined in claim 1, wherein a plurality of decade counter means are provided serially coupled to one another to form a chain of counters such that an overflow output from one counter defines an input to the next counter, each said decade counter means automatically normally effecting an overflow output upon receipt of every tenth digital pulse, said selective logic circuit means when actuated sensing the state of at least one of said serially coupled counters and effecting an overflow output therefrom upon receipt of every ninth digital pulse.

3. A device as defined in claim 2, wherein said selective logic circuit means is coupled to and senses the state of the first decade counter means of said plurality of serially connected counter means.

4. A device as defined in claim 3, wherein shift means are provided for transferring a count stored within a counter means of the counter chain to the next preceeding counter means of the counter chain.

5. A device as defined in claim 4, wherein said readout means comprises a visual numerical display apparatus coupled to said first decade counter means.

* * * * *